(12) United States Patent
Peng et al.

(10) Patent No.: US 8,268,462 B2
(45) Date of Patent: Sep. 18, 2012

(54) HYBRID GRAIN BOUNDARY ADDITIVES

(75) Inventors: Yingguo Peng, Pittsburgh, PA (US);
Ganping Ju, Sewickley, PA (US)

(73) Assignee: Seagate Technology LLC, Cupertino, CA (US)

( * ) Notice: Subject to any disclaimer, the term of this patent is extended or adjusted under 35 U.S.C. 154(b) by 23 days.

(21) Appl. No.: 12/341,245

(22) Filed: Dec. 22, 2008

(65) Prior Publication Data

US 2010/0159285 A1 Jun. 24, 2010

(51) Int. Cl.
*G11B 5/66* (2006.01)
(52) U.S. Cl. .................................. 428/836.2; 428/836.3
(58) Field of Classification Search .......................... None
See application file for complete search history.

(56) References Cited

U.S. PATENT DOCUMENTS

| | | | |
|---|---|---|---|
| 6,410,133 B1 | 6/2002 | Kirino et al. .................. 428/336 |
| 6,630,255 B1 | 10/2003 | Litvinov et al. ............... 428/694 |
| 6,656,613 B2 | 12/2003 | Litvinov et al. ............... 428/694 |
| 6,667,116 B1 | 12/2003 | Uwazumi et al. ............. 428/694 |
| 6,777,113 B2 | 8/2004 | Trindade et al. .............. 428/694 |
| 7,405,011 B2 | 7/2008 | Stipe et al. ................. 428/831.2 |
| 7,407,685 B2 | 8/2008 | Watanbe et al. .............. 427/127 |
| 7,531,248 B1* | 5/2009 | Nolan et al. .................. 428/829 |
| 2004/0106010 A1 | 6/2004 | Iwasaki et al. ................ 428/694 |
| 2006/0002026 A1* | 1/2006 | Stipe et al. .................... 360/135 |
| 2006/0042073 A1 | 3/2006 | Baumgartner et al. ......... 29/604 |
| 2006/0088733 A1* | 4/2006 | Hosoe et al. .................. 428/827 |
| 2006/0269797 A1 | 11/2006 | Lu et al. ........................ 428/834 |
| 2007/0148500 A1* | 6/2007 | Maeda et al. ................. 428/832 |
| 2007/0160824 A1* | 7/2007 | Ichihara et al. ............ 428/304.4 |
| 2007/0248843 A1* | 10/2007 | Wu et al. ........................ 428/827 |
| 2008/0026255 A1* | 1/2008 | Das et al. .................... 428/831.2 |
| 2009/0052074 A1* | 2/2009 | Nakagawa et al. ............. 360/39 |
| 2010/0007989 A1* | 1/2010 | Xu et al. ....................... 360/131 |

* cited by examiner

*Primary Examiner* — Holly Rickman
(74) *Attorney, Agent, or Firm* — Alan G. Rego; Westman, Champlin & Kelly, P.A.

(57) ABSTRACT

Magnetic layers are described that include the use of magnetic grains and non-magnetic grain boundaries with hybrid additives. Hybrid additives include the use of at least two different additives in the composition of the grain boundaries of a magnetic layer in magnetic recording media. The use of hybrid additives in the grain boundaries results in improved recording media. Methods for forming magnetic layers and magnetic recording media with the hybrid additive grain boundaries are also described.

16 Claims, 3 Drawing Sheets

HYBRID GRAIN BOUNDARY ADDITIVES

BACKGROUND OF THE INVENTION

This invention relates to magnetic recording media and in particular to the structure of the magnetic layer.

There are many different forms of mass data storage technology used in modern computing. One of the prevailing forms of data recording is magnetic data recording due to its large capacity and re-usable recording media. Magnetic data recording may be implemented utilizing different types of magnetic recording media, including tapes, hard disks, floppy disks, etc. There is an ever increasing need for magnetic recording media with higher storage capacity, lower noise, and lower costs.

Magnetic recording media can be longitudinal magnetic recording media or, more recently, perpendicular magnetic recording media. Perpendicular recording media have many advantages over longitudinal recording media and are currently the more preferred magnetic recording media.

The structure of a typical perpendicular magnetic recording disk is multilayered and includes a substrate at its base covered by one or more underlayers such as soft magnetic underlayers followed by a hard magnetic layer and optionally, additional protective layer(s) on top of the magnetic layer. The protective overcoat protects the magnetic recording layer from corrosion and reduces frictional forces between the disc and a read/write head. In addition, a thin layer of lubricant may be applied to surface of the protective overcoat to enhance the tribological performance of the head-disc interface by reducing friction and wear of the protective overcoat.

The composition of a hard magnetic layer can vary but can include such compounds as FePt or CoPt as described, for example, in US Patent Appln. Publication US2004/0191578 to Chen et al. The quality of the magnetic layer is in part determined by the layer or layers between the substrate and the magnetic layer. Important magnetic properties, for example, coercivity which are crucial to the recording performance of a disk can depend, for example, on the microstructure of the various underlayers.

Granular perpendicular magnetic recording media has been developed for its capability of further extending the areal density of stored data, as compared to conventional perpendicular media, which is limited by the existence of strong lateral exchange coupling between magnetic grains. A granular perpendicular recording medium comprises a granular perpendicular magnetic layer having magnetic columnar grains separated by grain boundaries.

The grain boundaries provide a substantial reduction in the magnetic interaction between the magnetic grains. The grain boundary materials determine, to a large degree, the magnetic grain size, boundary width, exchange coupling strength between grains, etc., hence they play a key role in the recording performance of the media. Currently, grain boundary materials include a single additive compound that improves a particular feature of the magnetic layer. For example, in a FePt granular media, MgO can be used as the grain boundary additive because it provides a smooth media surface.

SUMMARY OF THE INVENTION

In a first aspect, the present invention includes a magnetic recording medium comprising a substrate, one or more underlayers and a magnetic layer wherein the magnetic layer comprises magnetic grains and grain boundary materials comprising hybrid additive compounds.

In another aspect, the present invention includes a magnetic layer comprising magnetic grains and grain boundary materials comprising hybrid additive compounds.

In a further aspect, the present invention includes a method of making a magnetic recording medium comprising forming one or more underlayers over a nonmagnetic substrate and forming a magnetic layer over the underlayers wherein the magnetic layer comprises magnetic grains and grain boundaries comprise hybrid additive compounds.

In yet a further aspect, the present invention includes a method of making a magnetic layer comprising incorporating grain boundaries comprising hybrid additive compounds with magnetic grains to form a magnetic layer.

In yet another aspect, the present invention includes a method of making a magnetic recording medium. The method includes incorporating a magnetic layer wherein the magnetic layer includes magnetic grains and grain boundary materials having hybrid additives.

DETAILED DESCRIPTION OF ILLUSTRATIVE EMBODIMENTS

Magnetic recording media have a multilayer structure and generally include a substrate, one or more underlayers and a hard magnetic layer over the underlayers. The underlayers can include, for example, one or more soft magnetic layers. The hard magnetic layers described herein contain magnetic grains separated by grain boundary materials. The grain boundary materials used in the hard magnetic layers include hybrid additives. The use of hybrid additives in magnetic layers can enhance the performance of the recording media. In preferred embodiments, hybrid additives are used in $L1_0$ phase media and in more preferred embodiments, hybrid additives are used in $L1_0$ phase FePt media.

Hybrid additives, as used herein, refer to grain boundary materials that include two or more non-magnetic additives with different properties that coexist in the boundary at the same time. Grain boundary materials can determine a number of characteristics of magnetic recording media including grain size, boundary width, exchange coupling strength between grains and the like. A variety of additives that can be used as grain boundary materials are known in the art and include oxides, nitrides, and carbides. MgO, C and BN, for example, are non-magnetic materials that are used as additives. Two or more of these additives are generally incorporated in the grain boundaries in accordance with the present invention. The incorporation of hybrid additives into the grain boundary materials can advantageously enhance multiple characteristics of the magnetic layer and thus lead to improved magnetic recording media.

Figure 1:
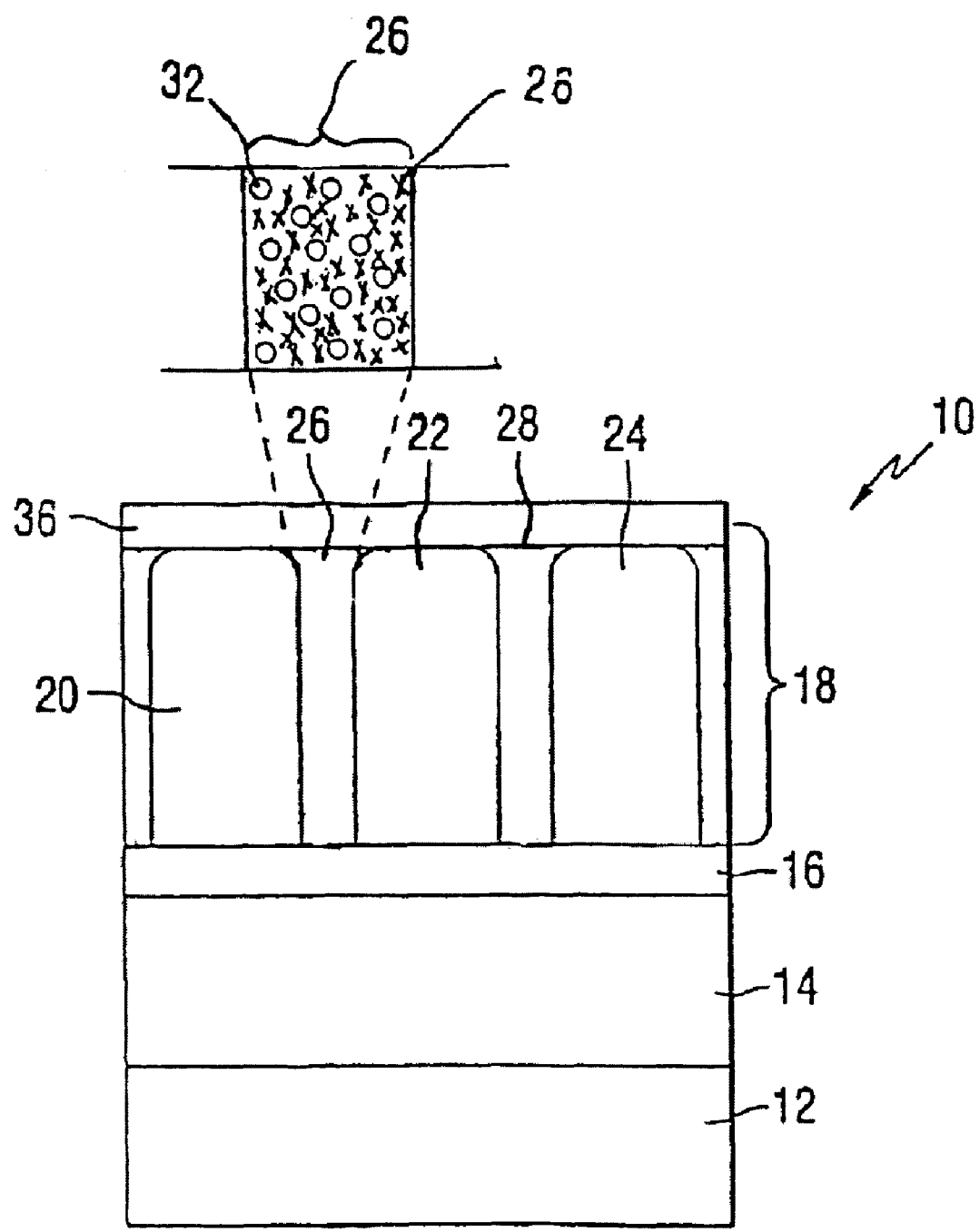
FIG. 1 is a schematic representation of a magnetic recording media.

FIG. 1 is a cross-sectional view of a magnetic recording medium 10 constructed in accordance with this invention. The medium includes a substrate 12. A soft magnetic underlayer 14 is formed on the substrate and may comprise a plurality of layers. An interlayer 16 is positioned on the soft underlayer 14. A hard magnetic layer 18 is positioned on the interlayer 16. The magnetic recording layer 18 includes a plurality of grains 20, 22 and 24 of magnetic material and a plurality of boundaries 26, 28 of non-magnetic material. Additives 30 and 32 are shown in grain boundary 26. A protective layer 36 is shown above magnetic layer 18.

Magnetic recording media described herein include a substrate that is generally formed of a nonmagnetic material. Suitable materials for the substrate can include, for example, high temperature glass, Si, ceramic glass, amorphous glass, NiP plated AlMg, sapphire, quartz, canasite, and SiC. Other suitable materials for substrates are known to those skilled in the art and are all within the scope of the description herein.

One or more underlayers may be included in the magnetic recording media between the substrate and the hard magnetic layer. The underlayer(s) are generally thin film layers and can be composed of metals, alloys and the like having a variety of structures.

In some embodiments, a soft magnetic underlayer is formed on top of the substrate layer and can include multiple layers. The soft magnetic underlayer is the layer that conducts the magnetic flux from a recording head in the writing process. The soft magnetic layer can comprise magnetically soft materials generally including iron (Fe) and cobalt alloys (Co), for example, alloys of iron and nickel (FeNi), alloys of iron and nitrogen (FeN), alloys of iron, cobalt and boron (FeCoB) and the like. The thickness of the soft magnetic underlayer can vary. The thickness can be at least about 5 nm. Preferably, the thickness is between about 10 nm and about 100 nm.

An interlayer may also be included in the layered structure of the magnetic recording media. The interlayer sets up the orientation and microstructure of the adjacent magnetic layer which has a very well decoupled grain structure. Interlayer materials can include, for example, tantalum (Ta), Chromium (Cr), silver (Ag), copper (Cu), gold (Au), platinum (Pt), Cr alloys, such as CrRu, non-magnetic cobalt chromium (CoCr) and MgO, RuAl, NiAl. The interlayer may have a thickness of between about 5 to about 500 Angstroms. In embodiments with $L1_0$ phase FePt media, MgO is used as the interlayer.

The hard magnetic layer of the recording media can include magnetic grains and non-magnetic grain boundaries. Suitable hard magnetic grains can include a variety of materials such as CoCr, FePt, CoPt, FePd, CoPd, CoFePd, CoCrPt, CoCrPd and the like. The hard magnetic layer may have a thickness, for example, from about 2 nm to about 40 nm. Preferably, the thickness of the hard magnetic layer is between about 5 nm and 30 nm. Thickness outside this range are also within the scope of this invention. A protective overcoat layer, such as a diamond-like carbon, may be applied over the hard magnetic layer.

The magnetic grains, and thus, the magnetic layer can be described by the crystal structure of the grains. Examples of crystal structures of the magnetic grains include, for example, hexagonal close packed (hcp) lattice structure and face-centered cubic (fcc) lattice structure. In one exemplary embodiment, a magnetic layer with FePt has a $L1_0$ phase, aka, face-centered tetragonal (fct) crystal structure.

The non-magnetic grain boundaries in the magnetic layers of the present invention generally include hybrid additives. Hybrid additives include at least two additives. Incorporation of more than two additives in the grain boundaries is also within the scope of this invention. Additives that can be used as grain boundary materials include oxides, nitrides, carbides and the like. Examples of additives include $SiO_x$, $MgO_x$, carbon (C), Boron (B), Boron Nitride (BN), Boron Carbide (BC), CN, $SiN_x$, $SiC_x$, $AlO_x$, yttrium stabilized zirconia (YSZ), $TiO_x$, $TaO_x$ and the like. Hybrid additives that can be incorporated into the grain boundaries include combinations of the above mentioned additives such as MgO—C, BN—C, C—$SiO_x$, C—$TiO_x$, C—$SiN_x$, C—$TaO_x$ and the like.

Additives that are used as grain boundary materials, when used alone, can impart certain properties to the recording media. MgO, for example, can provide a smooth media surface but can cause a mixed c-axis orientation. The C additive can yield a good orientation but can produce a rough surface. In contrast, the hybrid additive that includes MgO—C can provide a smooth surface with good orientation. The use of hybrid additives can provide multiple beneficial properties to the magnetic layer and lead to a superior magnetic recording media.

In some embodiments, the hybrid additives can be used in the non-magnetic grain boundaries by mixing the additives, before or during deposition, to form hybrid additives that can then be used as a grain boundary material. In other embodiments, each of the additives can be incorporated into the magnetic layer sequentially. After deposition into the magnetic layer, the additives rearrange to form a hybrid additive with the corresponding properties.

Hybrid additives may be incorporated into conventional longitudinal magnetic media and/or perpendicular media. In one preferred embodiment, the hard magnetic layer is a $L1_0$ phase FePt media. Grain boundaries with hybrid additives MgO—C and BN—C can be incorporated into this media as exemplified in the Examples below. The FePt media is generally formed in a high temperature process and thus, the hybrid additives incorporated into FePt media should be compatible with the high temperature process. For embodiments with FePt, the process temperature is generally at least about 350° C. or higher.

The amount of hybrid additives included in the magnetic layer can vary. Preferably, the hybrid additives can be between about 10 percent and about 70 percent by volume of the total hard magnetic layer that includes magnetic grains and additives. More preferably, the hybrid additive compounds can be between about 30 percent and about 50 percent by volume of the total hard magnetic layer.

The ratio of the each of the additives within the hybrid additive can vary. The range for each of the additive can be between from about 5% to 95% of the hybrid additive by volume. Exemplary amounts of MgO and C in a MgO—C hybrid additive can be about 20% and about 80%, about 50% each, or about 80% and about 20%, respectively.

The size of the magnetic grains with a hybrid additive grain boundary can be between about 3 nm and about 30 nm. Preferably, the magnetic grains are between about 3 nm and about 10 nm in the recording media.

Additional layer(s) may be placed over the magnetic layer in the magnetic recording media. These additional layers may be an overcoat layer and/or a protective layer. The overcoat layer can be, for example, non-magnetic metals or nonmagnetic alloys. The protective layer may be composed of a thin film containing carbon as its main component. A lubricant layer may also be placed on top of the protective layer. A variety of liquid lubricants are known in the art.

Magnetic layers with the hybrid additive grain boundaries described herein may be incorporated into a variety of recording media. These media include tapes, discs and the like that contain magnetic grains and grain boundaries.

The present invention also includes methods for making magnetic layers. The method includes forming a magnetic layer by employing magnetic grains and grain boundaries that include hybrid additives. The magnetic layer is generally formed over a substrate and any additional underlayers present over the substrate. Sputtering is generally employed to deposit materials onto a substrate and is a well known technique in the art. Radio frequency (RF) sputtering and DC sputtering are all known and may be used in the present invention. Depositions of the magnetic grains and hybrid additives for the hard magnetic layers may be conducted at a variety of temperatures and can be determined by the nature of the magnetic grains selected.

In some embodiments, all or some of the components of the hard magnetic layer may be co-sputtered. For example, the magnetic grains, and all of the additives may be co-sputtered onto the underlayers that coat a substrate to form a magnetic layer with magnetic grains and grain boundaries containing hybrid additives. Alternatively, the magnetic grains and one of the additives may be co-sputtered first followed by sputtering of the second additive and optionally, additional magnetic grains. In other embodiments, all of the components of the magnetic layer may be sputtered, sequentially, one at a time. Without being bound by theory, it is believed that all of the additives incorporate around the magnetic grains to generate a hybrid additive grain boundary whether the components are deposited by co-sputtering or layered by sputtering one component at a time.

The present invention also includes methods for making magnetic recording media. The method includes forming one or more underlayers over a non-magnetic substrate. The magnetic layer is then formed over the underlayer by incorporating magnetic grains and non-magnetic grain boundaries with hybrid additives as described above. Additional layers may be formed over the magnetic layers such as overcoat layers and protective layers to form the magnetic recording media.

EXAMPLES

Example 1

This Example Illustrates the Use of a MgO Plus C Hybrid Additive in a FePt Media Three different recording media were tested. An FePt:MgO, FePt:C and FePt:MgO—C recording media were constructed. The FePt:C media and the FePt:MgO—C media were constructed as known in the art and described briefly below. The structure of the media with the hybrid additive according to the present invention are shown below in Table 1.

TABLE 1

| Media | Structure |
|---|---|
| FePt:MgO | Si\MgO 25 nm\FePt:45 v % MgO 9 nm\COC 10 nm |
| FePt:C | Si\MgO 25 nm\FePt:45 v % C 9 nm\COC 5 nm |
| FePt:(MgO—C) | Si\MgO 20 nm\FePt:40 v % (C + MgO) 8 nm\COC 5 nm |

The recording media included a Si substrate. An underlayer comprising of MgO was sputtered onto the substrate to a thickness of about 20 nm. The magnetic layer included FeCuPt with 40% by volume of hybrid additive MgO—C (50:50). The MgO and the C additives were sputtered separately in layers. The magnetic layer had a thickness of about 8 nm. A carbon overcoat layer (COC) layer of 5 nm was placed over the magnetic layer.

Figure 2:
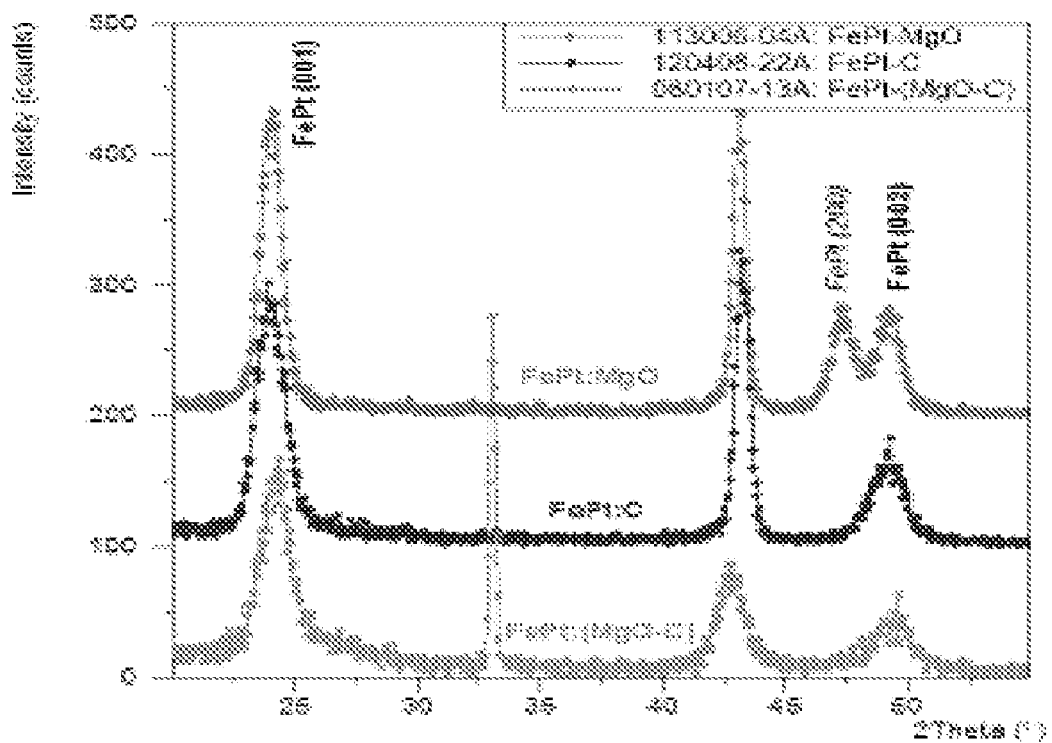
FIG. 2 is a X-Ray Diffraction (XRD) plot of FePt with MgO, C and MgO—C additives.
Figure 3:
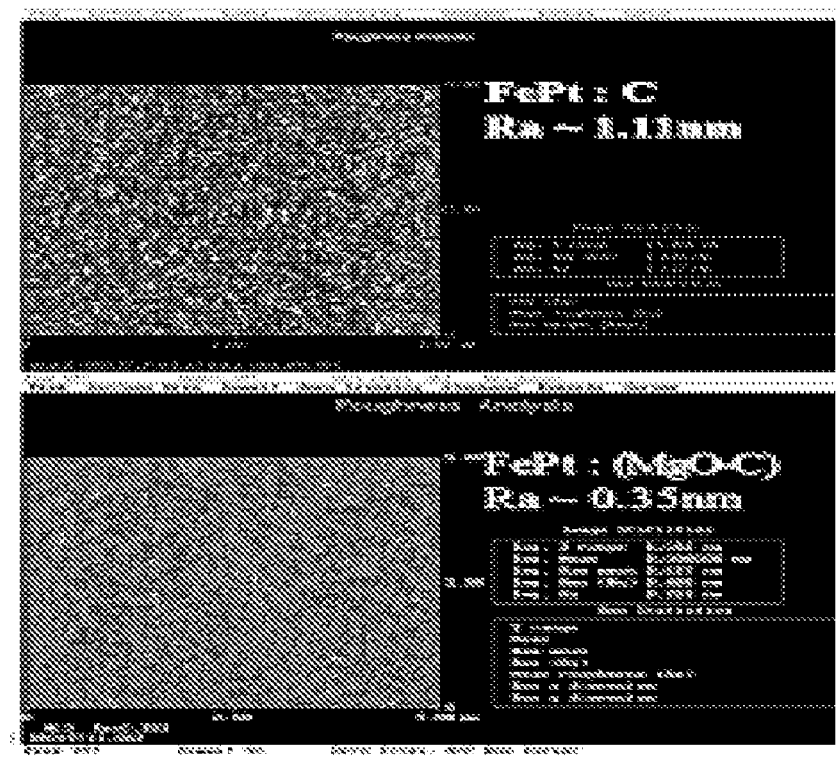
FIG. 3 is an atomic force microscopic (AFM) image of FePt:C and FePt:(MgO—C).

X-Ray diffraction studies of the FePt:MgO media showed a smooth surface but existence of in-plane variants. The FePt:C media has good orientation but tends to have a rougher surface (Ra~1.0 nm). FIG. 2 shows the existence of in-plane variants in FePt:MgO media, relatively large Ra value for FePt:C media (FIG. 3), and the good orientation and smooth surface of FePt, media having MgO—C hybrid additives as grain boundaries (FIG. 2 and FIG. 3).

Example 2

This Example Illustrates the Use of a BN Plus C Hybrid Additive to Obtain Small Grain Size and Prevent Corrosion The recording media were made as described above in Example 1. The structures of the media are shown in Table 2.

TABLE 2

| Media | Structure |
|---|---|
| FePt:C | Si\Ta 3.5 nm\MgO 7.5 nm\FePt:30 v % C 6 nm |
| FePt:BN | Si\Ta 3.5 nm\MgO 7.5 nm\FePt:30 v % BN 6 nm |
| FePt:(BN—C) | Si\Ta 3.5 nm\MgO 7.5 nm\FePt:30 v % (BN—C) 6 nm |

SEM were taken of the FePt:BN, FePt:C and FePt:BN—C. Glide tests were also conducted on all three of these media. Glide tests are known in the art and described in US Pat Publication US 2006/0042073.

Figure 4:
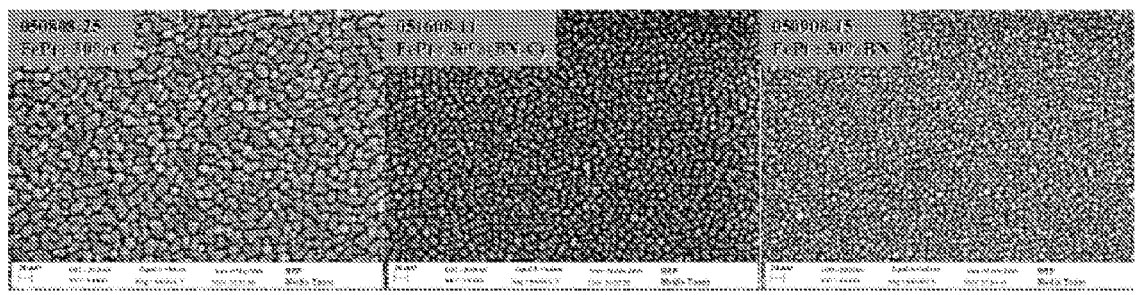
FIG. 4 is a scanning electron micrograph (SEM) of FePt:C, FePt: (BN—C) and FePt:BN.

A FePt:BN media has much smaller grain size than FePt:C media but it has severe corrosion problem and requires a much thicker media overcoat. FePt media with BN—C hybrid additive has similar corrosion resistance with FePt:C media while the grain size is much smaller. FIG. 4 shows SEM micrographs of FePt:C, FePt:BN—C and FePt:BN samples. It can be seen that FePt:BN—C media has smaller grain size than FePt:C media, but glide tests show similar pass yield. Although FePt:BN media has the smallest grain size, they failed the glide test. The design of BN—C hybrid additive provides a key solution for producing flyable FePt media with a small grain size.

Although the present invention has been described with reference to preferred embodiments, workers skilled in the art will recognize that changes may be made in form and detail without departing from the spirit and scope of the invention.

What is claimed is:
1. An apparatus comprising:
a substrate;
one or more underlayers; and
a magnetic layer,
wherein the magnetic layer comprises magnetic grains and grain boundaries comprising hybrid additives, the hybrid additives having been formed by a combination of two different additives,
wherein a first of the two different additives is MgO, which imparts an undesired mixed c-axis orientation to the magnetic layer; and
wherein a second of the two different additives is C, with a ratio of MgO to C of about 50:50 by volume, to counteract the undesirable mixed c-axis orientation imparted to the magnetic layer by MgO.
2. An apparatus comprising:
a substrate;
one or more underlayers; and
a magnetic layer,
wherein the magnetic layer comprises magnetic grains and grain boundaries comprising hybrid additives, the hybrid additives having been formed by a combination of two different additives, and
wherein a first of the two different additives is C, which imparts an undesired increased
surface roughness to the magnetic layer, and wherein a second of the two different additives is BN, with a ratio of BN to C of about 50:50 by volume, to counteract the undesirable increased surface roughness imparted to the magnetic layer by C.

3. An apparatus comprising:
a substrate;
one or more underlayers; and
a magnetic layer,
wherein the magnetic layer comprises magnetic grains and grain boundaries comprising hybrid additives, the hybrid additives having been formed by a combination of two different additives,
wherein a first of the two different additives is MgO that imparts an undesired mixed c-axis orientation to the magnetic layer, the MgO is in a range of about 5% to 95% by volume of the hybrid additive; and
wherein a second of the two different additives is C to counteract the undesirable mixed c-axis orientation imparted to the magnetic layer by MgO, the C is in a range of about 5% to 95% by volume of the hybrid additive.

4. The apparatus of claim 3, wherein the MgO is in a range of about 20% to 80% by volume of the hybrid additive and wherein the C is in a range of about 20% to 80% by volume of the hybrid additive.

5. The apparatus of claim 3, wherein the hybrid additive is between 10% and 70% by volume of the magnetic layer.

6. The apparatus of claim 5, wherein the hybrid additive is between 30% and 50% by volume of the magnetic layer.

7. The apparatus of claim 3 wherein the magnetic layer comprises FePt or CoPt.

8. The apparatus of claim 3 and further comprising an overcoat layer over the magnetic layer.

9. The apparatus of claim 3 wherein a thickness of the magnetic layer is between about 5 nm and about 30 nm.

10. An apparatus comprising:
a substrate;
one or more underlayers; and
a magnetic layer,
wherein the magnetic layer comprises magnetic grains and grain boundaries comprising hybrid additives, the hybrid additives having been formed by a combination of two different additives,
wherein a first of the two different additives is C that imparts an undesired increased surface roughness to the magnetic layer, the C is in a range of about 5% to 95% by volume of the hybrid additive; and
wherein a second of the two different additives is BN to counteract the undesirable increased surface roughness imparted to the magnetic layer by C, the BN is in a range of about 5% to 95% by volume of the hybrid additive.

11. The apparatus of claim 10, wherein the BN is in a range of about 20% to 80% by volume of the hybrid additive and wherein the C is in a range of about 20% to 80% by volume of the hybrid additive.

12. The apparatus of claim 11, wherein the hybrid additive is between 10% and 70% by volume of the magnetic layer.

13. The apparatus of claim 12, wherein the hybrid additive is between 30% and 50% by volume of the magnetic layer.

14. The apparatus of claim 10 wherein the magnetic layer comprises FePt or CoPt.

15. The apparatus of claim 10 and further comprising an overcoat layer over the magnetic layer.

16. The apparatus of claim 10 wherein a thickness of the magnetic layer is between about 5 nm and about 30 nm.

* * * * *